(12) United States Patent
Meissner

(10) Patent No.: US 7,065,986 B2
(45) Date of Patent: Jun. 27, 2006

(54) MOLDING ASSEMBLY

(75) Inventor: Stephen C. Meissner, West Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 501 days.

(21) Appl. No.: 10/299,118

(22) Filed: Nov. 19, 2002

(65) Prior Publication Data

US 2004/0096536 A1 May 20, 2004

(51) Int. Cl.
*C03B 11/08* (2006.01)

(52) U.S. Cl. .................. 65/323; 264/1.32; 425/411; 425/468; 425/808

(58) Field of Classification Search .............. 65/64, 65/102, 323; 425/411, 468, 808; 264/1.32
See application file for complete search history.

(56) References Cited

U.S. PATENT DOCUMENTS

| | | | | |
|---|---|---|---|---|
| 947,632 A * | 1/1910 | Bolton | ......................... | 65/307 |
| 1,342,056 A * | 6/1920 | Miller | ......................... | 65/362 |
| 2,706,491 A * | 4/1955 | Kohler | ........................ | 137/540 |
| 4,056,341 A * | 11/1977 | Moore | .......................... | 425/77 |
| 4,206,617 A * | 6/1980 | Nakamoto | .................... | 464/99 |
| 4,354,818 A * | 10/1982 | Morris | ..................... | 425/405.2 |
| 4,480,490 A * | 11/1984 | Inoue | .......................... | 74/401 |
| 4,696,692 A * | 9/1987 | Schmitt | ....................... | 65/102 |
| 4,786,444 A * | 11/1988 | Hwang | ..................... | 264/1.38 |
| 4,964,903 A | 10/1990 | Carpenter et al. | | |
| 5,125,945 A * | 6/1992 | Menihan et al. | ................ | 65/66 |
| 5,211,969 A | 5/1993 | Yoshimura | | |
| 5,213,603 A * | 5/1993 | Giles et al. | .................... | 65/305 |
| 5,264,016 A | 11/1993 | Komiyama | | |
| 5,282,878 A | 2/1994 | Komiyama et al. | | |
| 5,346,522 A | 9/1994 | Komiyama et al. | | |
| 5,782,946 A | 7/1998 | Komiyama et al. | | |
| 5,788,732 A * | 8/1998 | Nomura et al. | ................. | 65/64 |
| 5,893,942 A * | 4/1999 | Nickey et al. | ................. | 65/171 |
| 5,938,807 A | 8/1999 | Komiyama et al. | | |
| 2001/0053395 A1 * | 12/2001 | Hosoe | ........................ | 425/408 |

* cited by examiner

*Primary Examiner*—Sean Vincent
(74) *Attorney, Agent, or Firm*—Stephen H. Shaw

(57) ABSTRACT

A molding assembly, that includes: a plurality of support pillars fixedly attached to a support structure, wherein each support pillar includes a recessed seat; a mold support member, and; a flexible ring for holding a mold in contact with the mold support member, wherein the flexible ring, while holding the mold, rests upon the recessed seat of the support pillar.

13 Claims, 6 Drawing Sheets

MOLDING ASSEMBLY

FIELD OF THE INVENTION

The invention relates generally to the field of work piece holding, and in particular to work piece holding on glass pressing machines. More specifically, the invention relates to holding of a mold while assuring concentric alignment with a pressing axis during molding of hot glass elements.

BACKGROUND OF THE INVENTION

Molding of precision glass optical elements requires pressing together an upper and lower mold pair. Alignment of this pair is crucial in generating acceptable precision optical components. A prior art molding apparatus 10 as depicted in FIG. 1, and described further in U.S. Pat. No. 4,964,903 titled "Apparatus For Molding Glass Molds" issued Oct. 23, 1990 to Carpenter et al, and U.S. Pat. No. 5,211,969, titled "Mold For Press Molding Of Optical Element" issued May 18, 1993 to Yoshimura, includes an upper mold 1 and a lower mold 3 in a sleeve member 2, so as to be slideable in a longitudinal direction of the sleeve member 2. An upper driving member 4 and a lower driving member 5 provide a force upon the upper mold 1 and lower mold 3. Either one of the driving members 4 or 5 may be stationary, or in the alternative may be movable; thus, providing a degree of concentric alignment. However, alignment limitations exist due to an inherent clearance that allows the molds 1 and 3 to slide between the sleeve member 2. This inherent clearance provides an undesirable potential for tilting and/or shifting of the molds 1 and 3 during a pressing operation which negatively impacts the generated optical element. Translational and concentric error of the molds 1 or 3 may result; thereby, causing misalignment of a work piece's generated surfaces held or formed by the molds 1 and 3.

A second molding apparatus 20 depicted in FIG. 2, and further described in U.S. Pat. No. 5,264,016 titled "Method For Manufacturing Glass Lenses" issued Nov. 23, 1993 to Komiyama; U.S. Pat. No. 5,346,522 titled "Method And Apparatus For Molding Optical Glass Elements Or The Like" issued Sep. 13, 1994 to Komiyama et al.; U.S. Pat. No. 5,282,878 titled "Apparatus For Molding Optical Glass Elements" issued Feb. 1, 1994 to Komiyama et al; U.S. Pat. No. 5,782,946 titled "Method For Manufacturing Press-Molded Glass Object" issued Jul. 21, 1998 to Komiyama et al.; and U.S. Pat. No. 5,938,807 titled "Method For Manufacturing Press-Molded Glass Object And Apparatus Therefor" issued Aug. 17, 1999 to Komiyama et al. includes an upper mold 31 with upper driving member 34 and a lower mold 33 with lower driving member 35. The molding apparatus 20 does not use an external sleeve to provide alignment, as the molding apparatus 10 shown in FIG. 1. Without an external sleeve to provide axial alignment of the upper and lower mold pair 31 and 33, alignment must be achieved through the precision of the apparatus. Members (not shown) that support upper and lower molds 31 and 33 are manufactured incorporating a desired level of concentric alignment and have significant rigidity to perform the pressing operation without distortion. As such, concentric alignment of upper and lower molds 31 and 33 relies upon the ability of a ring member 32 to hold molds 31, 33 concentric to upper and lower driving members 34 and 35 during application of high temperatures. In FIG. 3, an exploded view shows the ring member 32 capable of holding lower mold 33 while in contact with lower driving member 35. The prior art ring member 32, as shown in FIGS. 2, 3, and 4, is simply a rigid round disk with a central hole 40 and may have an additional relief 41 on the underside to provide clearance for retaining features on the molds 31 and 33, such as flanges. During high temperature applications, the diameter of the central hole 40 increases more than the diameter of a cylindrical mold, thereby increasing clearance and loosening the entire assembly. This clearance provides a potential for translational movement between the molds 31 and 33 during the pressing operation which negatively impacts the generated optical element.

What is needed is a molding apparatus with minimal potential for misaligning the upper and lower molds.

SUMMARY OF THE INVENTION

The above described need is met according to the present invention by providing a molding assembly, that includes: a plurality of support pillars fixedly attached to a support structure, wherein each one of the plurality of support pillars includes a recessed seat; a mold support member, and; a flexible ring for holding a mold in contact with the mold support member, wherein the flexible ring, while holding the mold, rests upon the recessed seat of a corresponding support pillar.

BRIEF DESCRIPTION OF THE DRAWINGS

The above and features, and advantages of the present invention will become more apparent when taken in conjunction with the following description and drawings wherein identical reference numerals have been used, where possible, to designate identical features that are common to the figures, and wherein.

To facilitate understanding, identical reference numerals have been used, where possible, to designate identical elements that are common to the figures.

DETAILED DESCRIPTION OF THE INVENTION

The device of the invention allows concentric alignment and firm gripping of molds in a molding assembly. Due to the brittle nature of cylindrical molds, care must be taken to ensure contact stresses remain below critical levels. The flexible ring was carefully designed to minimize contact stresses while providing concentric positioning. The device provides a means to maintain concentric alignment between molds without an enclosing sleeve, and eliminates clearance between molding components via a clamping mechanism that actuates under high heat.

Without an external sleeve to provide axial alignment of the upper and lower mold pair, alignment must be achieved through the precision of the apparatus. Members that support upper and lower molds are manufactured incorporating the desired level of concentric alignment and have significant rigidity to perform the pressing operation without distortion. The flexible ring described allows the precision concentric alignment between upper and lower support members to be transferred to the upper and lower molds, respectively.

Figure 5:
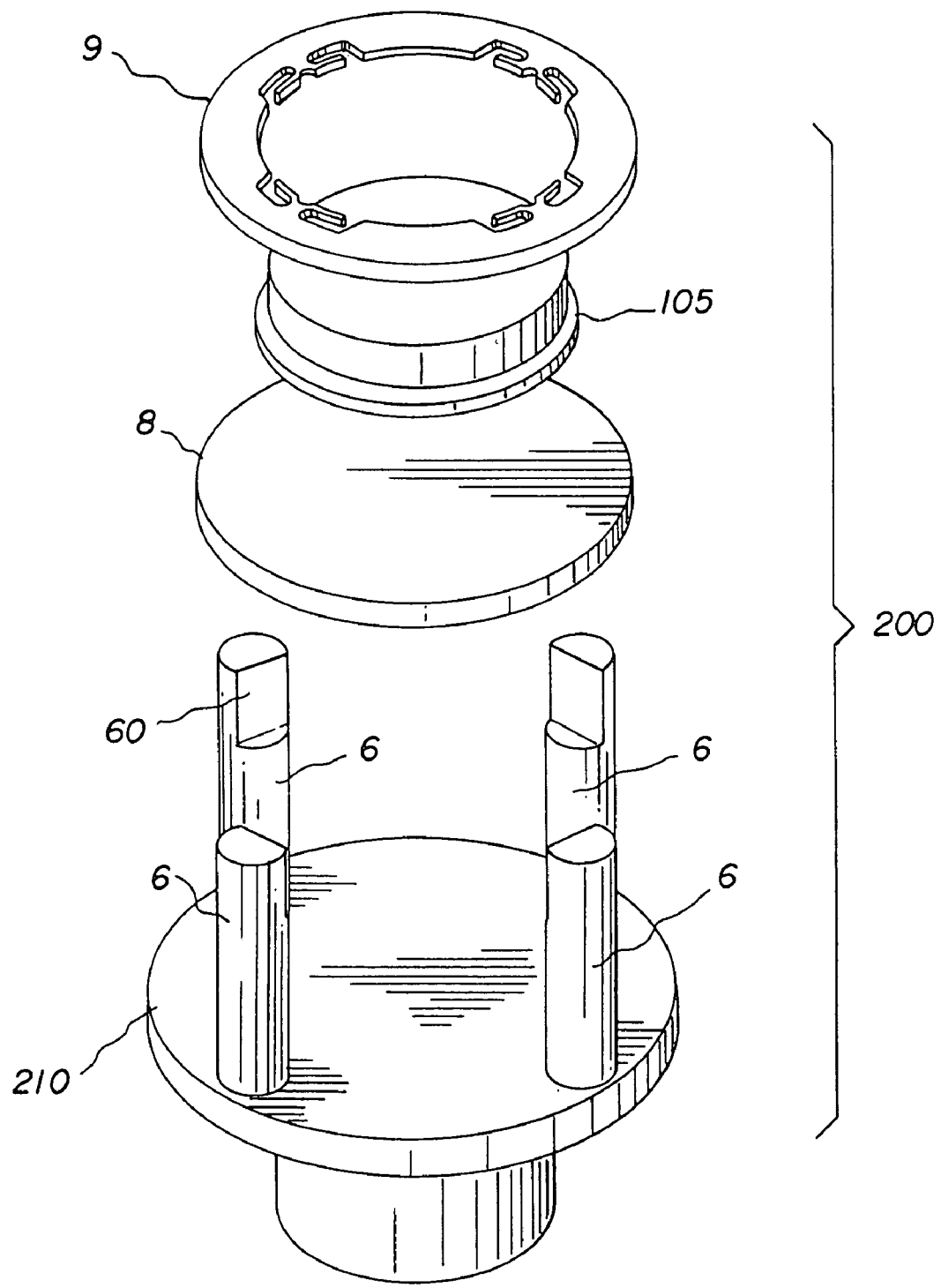
FIG. 5 is an exploded view of a glass molding apparatus assembly showing one embodiment of a flexible ring according to the present invention.

Referring to FIG. 5, a flexible ring 9 is used in a molding assembly 200 for glass molding. The molding assembly 200 includes a support structure 210 that drives molds toward one another during pressing and enables mounting of other components. Four support pillars 6 are mounted on the support structure 210 in a circle, concentric with the outside diameter of the support structure 210, and equally spaced with features that allow other components to be rigidly held.

Figure 6:
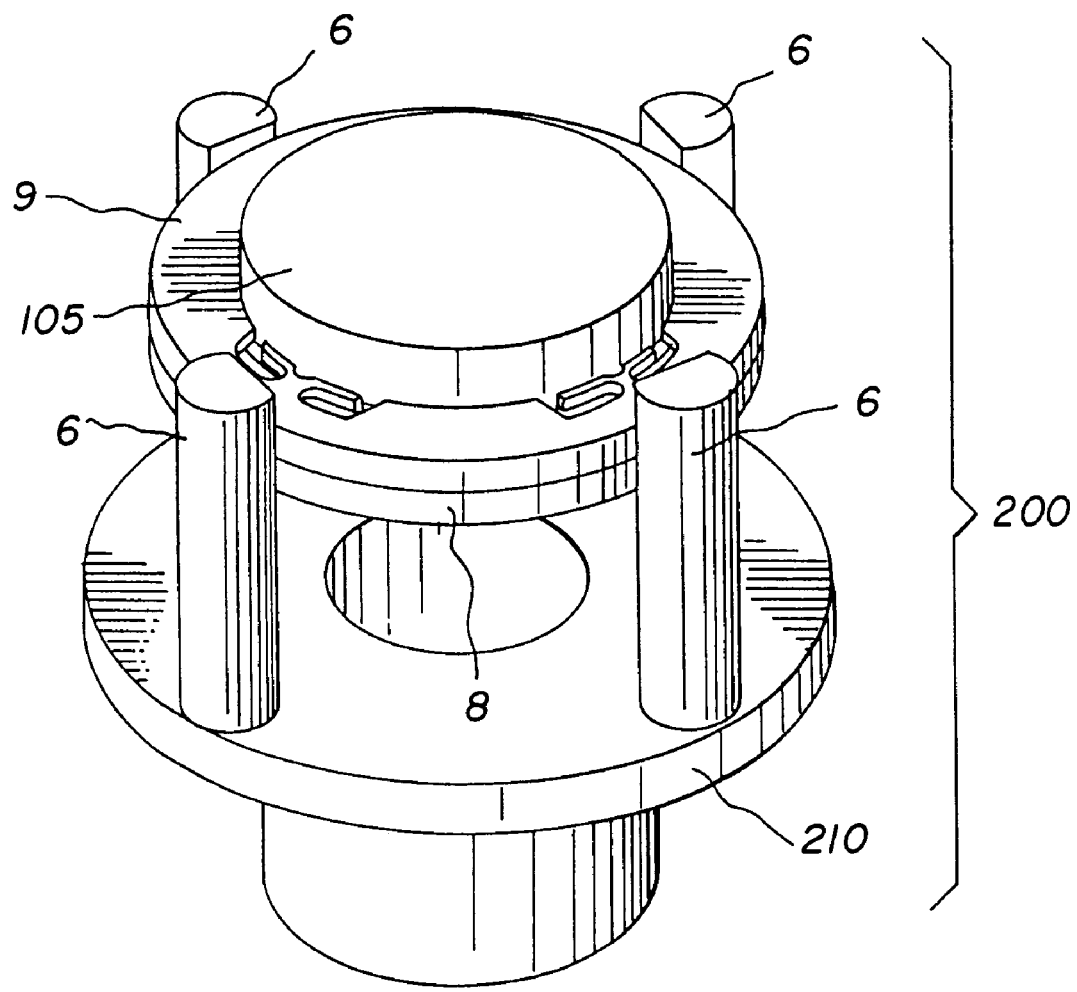
FIG. 6 is a collapsed view of the glass molding apparatus assembly in FIG. 5.
Figure 7:
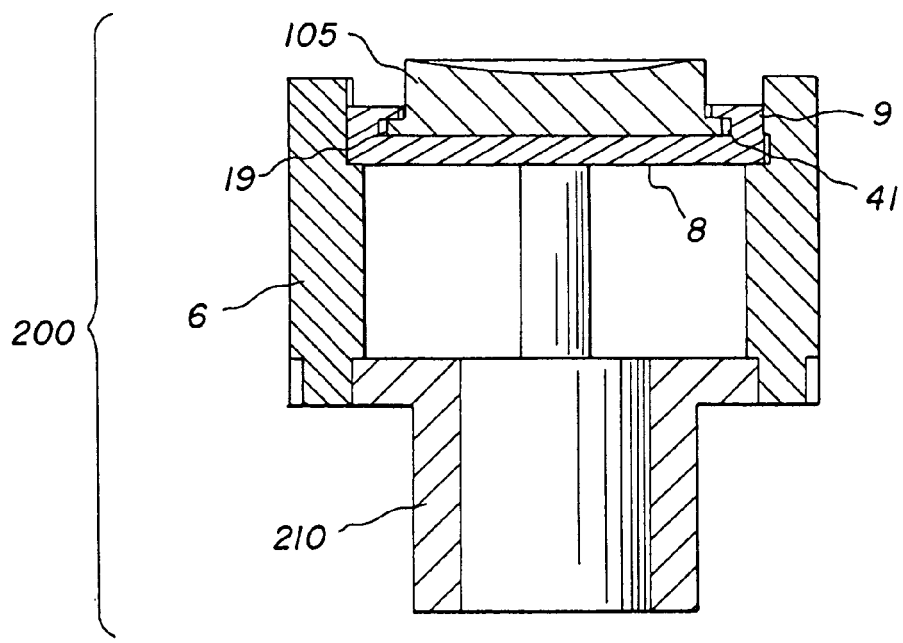
FIG. 7 is a cross-sectional view of the glass molding apparatus, disclosed in the present invention, showing placement of the flexible ring.

Referring to FIGS. 6 and 7, each support pillar 6 contains a recessed seat 60 (shown in the exploded view of FIG. 5) that is formed concentric with the outside diameter of the support structure 210 and relative to a cylindrical axis of the support structure 210. A mold support member 8, in the form of a solid round disk, is mounted upon the recessed seat 60 of the support pillars 6. The mold support member 8 supports a mold 105 during pressing operations. The mold 105, which may be cylindrical, is centrally placed on the mold support member 8. The flexible ring 9 is placed snuggly over the mold 105 while resting upon the recessed seat 60 of the support pillars 6. Thus, locating the mold 105 concentric to the mold assembly 200, due to the engagement of the circumference of the flexible ring 9 with the support pillars 6 and the recessed seats 60, as shown in FIG. 6.

Figure 1:
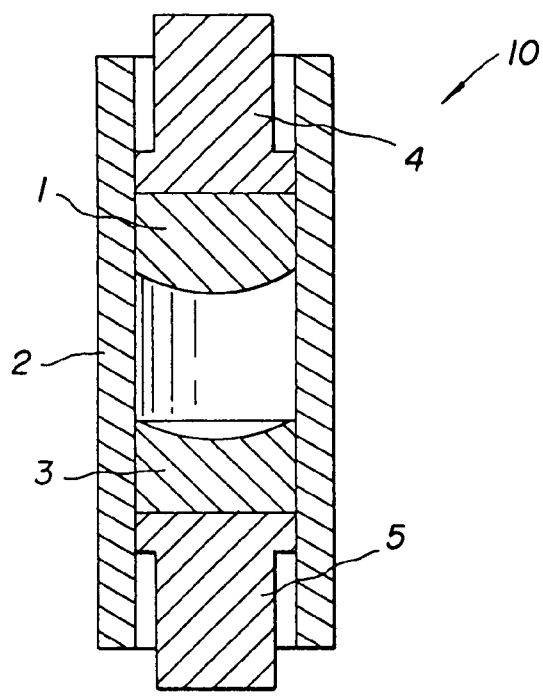
FIG. 1 is a cross-sectional view of an apparatus for molding glass as described in prior art.
Figure 2:
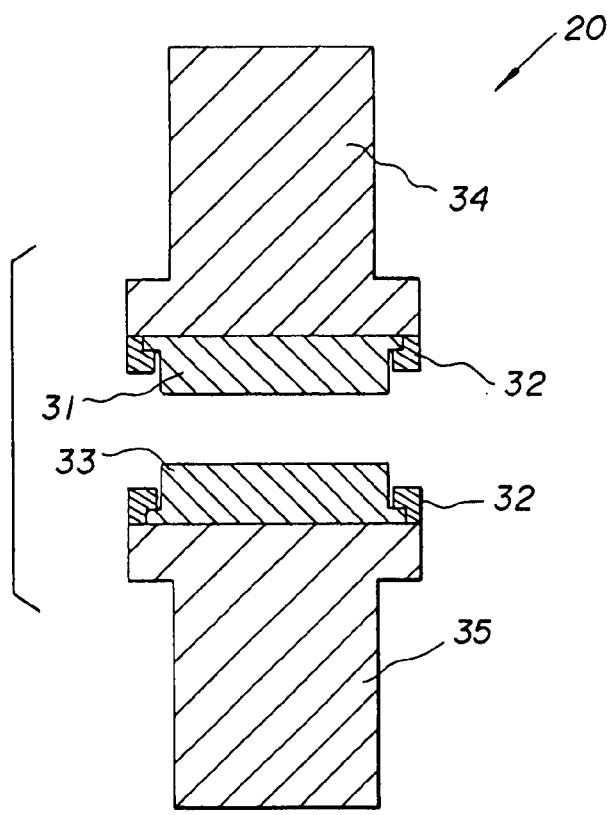
FIG. 2 is a cross-sectional view of another apparatus for molding glass as disclosed in prior art.
Figure 3:
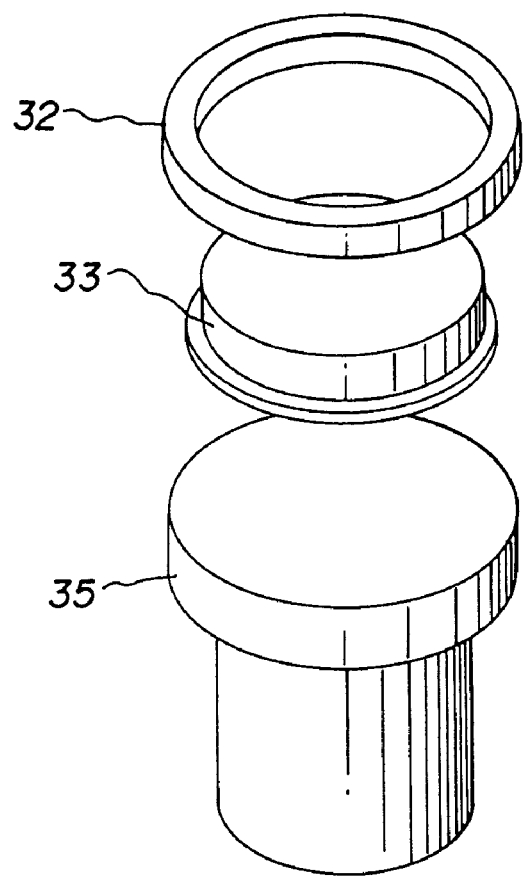
FIG. 3 is an exploded view of the lower pressing member from a glass molding apparatus as disclosed in prior art.
Figure 4:
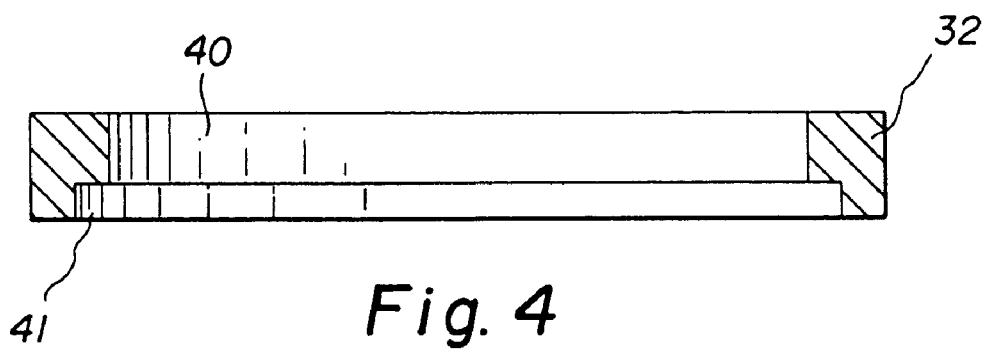
FIG. 4 is a cross-sectional view of a rigid ring member used in mold retention as disclosed in prior art.

The flexible ring 9 is constructed out of high temperature metal, such as platinum, tungsten, molybdenum, or tantalum, in the shape of a round disk. The construction of the flexible ring 9 starts out similar to the prior art rigid ring member 32, shown in FIG. 4, with a central hole 40, and possibly a relief 41 to accommodate molds with retaining features such as flanges 19 (as shown in FIG. 7) and the like, that protrude outside the body diameter of the mold 105. Continuing with the construction of the flexible ring 9, a series of circular slots are created to provide stress relief during thermal expansion.

Figure 8:
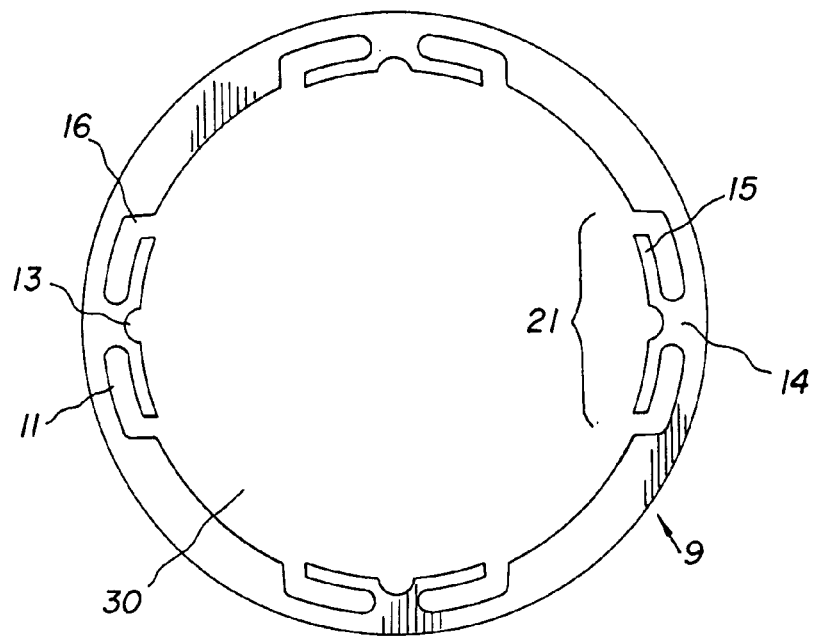
FIG. 8 is a top view showing one example of the flexible ring according to the present invention.

In one example of the flexible ring 9, herein shown in FIG. 8, four open circular slots 11 are created by removing segments 16 from the inner diameter 30 of the flexible ring 9. Fabrication of these slots and removal regions create gripping fingers 15. The gripping fingers 15 gently grip the cylindrical mold 105 when cold, and flex away from the cylindrical mold 105 upon thermal expansion; consequently, reducing contact stress upon the cylindrical mold 105. In order to allow flexure of gripping fingers 15 to readily occur, semi-circular regions 13 of material are removed. The combination of removed areas of material generates a contact arm 21 that includes a radial webbing 14 and the gripping fingers 15. Thermal expansion in the radial webbing 14 provides the necessary clamping force while the flexibility provided by the gripping fingers 15 reduces contact stress and prevents damage to mold 105.

As shown in FIG. 8 the flexible ring 9 is machined in specific locations, which allow linear thermal expansion to occur radially. Four contact arms 21 are created by machining away parts of the inside diameter 30. Each contact arm 21 is then relieved with a semi-circular region 13 at the center to provide a degree of flexure. In applications where the flexible ring 9 is required to hold small diameter parts, other features may be incorporated to allow additional flexure in-line with the radial segments that provide linear expansion, as shown in FIG. 9.

Figure 9:
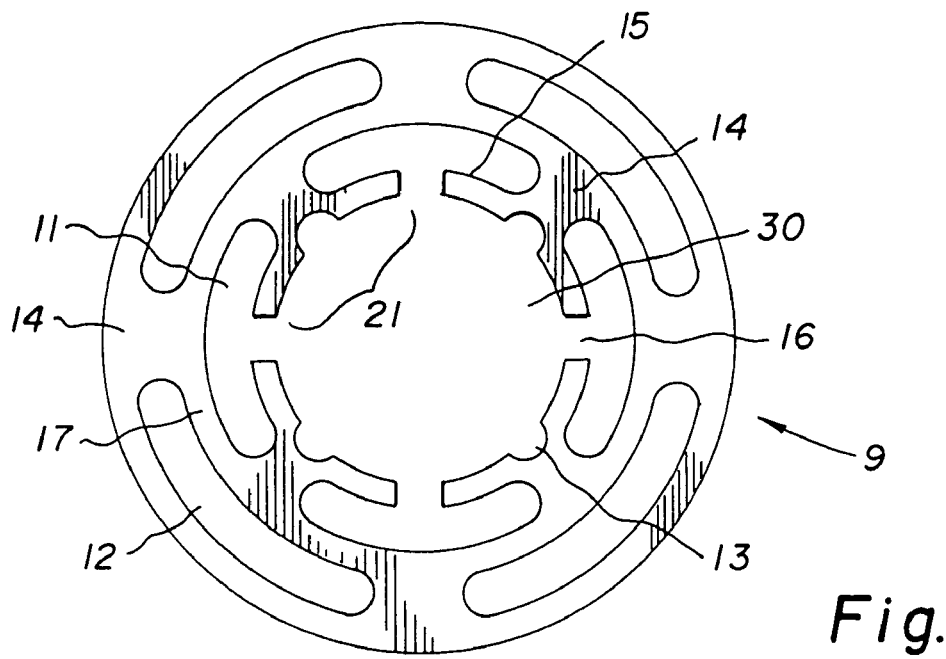
FIG. 9 is a top view showing another example of the flexible ring according to the present invention.

FIG. 9 discloses another example of the flexible ring 9 according to the present invention, wherein a set of closed circular slots 12 are incorporated to provide additional flexibility. For the flexible ring 9, the second set of four open circular slots 12 provides a cavity that allows flexure to occur in transverse web regions 17 and alleviates stress concentrations due to thermal expansion of the radial webbing 14.

Figure 10:
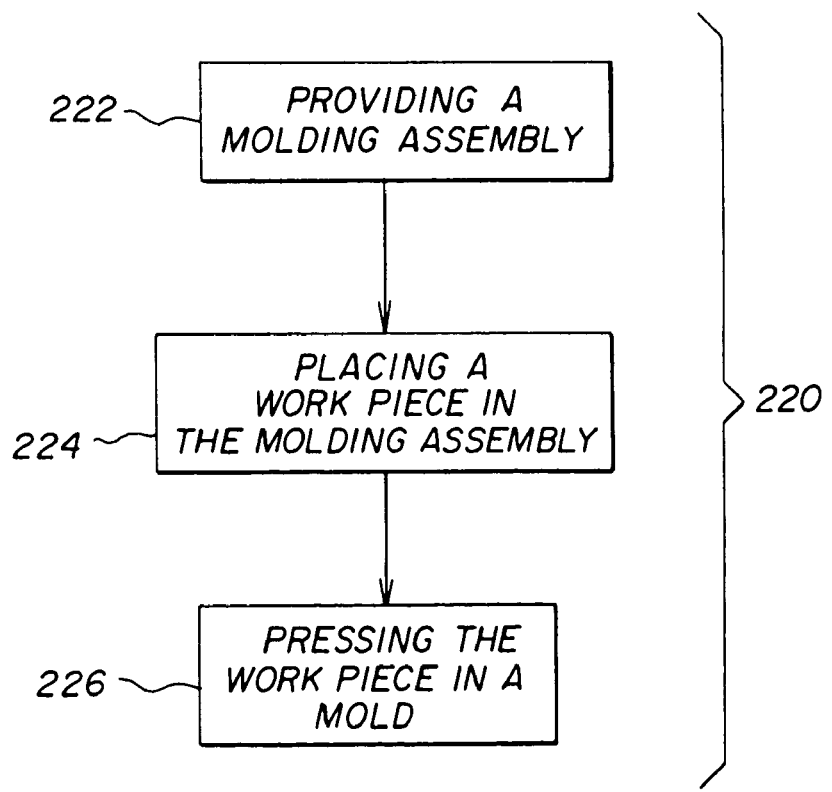
FIG. 10 is a flowchart for a method of molding a work piece.

Referring to FIG. 10, a flowchart 220 is shown for a method of molding a workpiece (not shown, but may be a lens blank for making lenses) in the molding assembly 200 shown in earlier described figures. In operation step 222, one provides a molding assembly 200 having: i) a plurality of support pillars 6 fixedly attached to a support structure 210, wherein each support pillar 6 includes a recessed seat 60; ii) a mold support member 8; iii) a flexible ring 9 for holding a mold in contact with the mold support member 8, wherein the flexible ring 9, while holding the mold 105, rests upon the recessed seat 60 of the support pillar 6. Subsequently, one places the workpiece (not shown) in the molding assembly 200 in operation 224; and in operation 226 one presses the workpiece in the mold 105.

The aforementioned present invention has been described with reference to two examples. However, it will be appreciated that variations and modifications can be effected by a person of ordinary skill in the art without departing from the scope of the invention.

PARTS LIST 1 upper mold
2 sleeve member
3 lower mold
4 upper driving member
5 lower driving member
6 support pillars
8 mold support member
9 flexible ring
10 prior art molding apparatus
11 open circular slot
12 closed circular slot
13 semi-circular region
14 radial web
15 gripping finger
16 removed segment
17 transverse web region
19 flange
20 prior art molding apparatus
21 contact arm
30 inner diameter
31 upper mold
32 ring member
33 lower mold
34 upper driving member
35 lower driving member
40 central hole
41 relief 60 recessed seat
105 mold
200 molding assembly

LIST—CONTINUED 210 support structure
220 flowchart
222 operation step
224 operation step
226 operation step

What is claimed is:

1. A molding assembly, comprising:
   a) a plurality of support pillars fixedly attached to a support structure, wherein each one of the plurality of support pillars includes a recessed seat;
   b) a mold support member; and
   c) a flexible ring that holds a mold in contact with the mold support member under applied high temperatures during glass molding, wherein the flexible ring, while holding the mold, rests upon the recessed seat of a corresponding support pillar, and wherein the flexible ring includes a segmented inner diameter having gripping fingers that flex, during thermal expansion, to relieve contact stress upon the mold, thereby allowing for simultaneous thermal expansion of the flexible ring and continued contact with the support pillars and the mold.

2. The molding assembly claimed in claim 1, wherein the plurality of support pillars include selected regions removed from each one of the plurality of support pillars to form the recessed seat while providing concentric positioning of the mold support member relative to a cylindrical axis of the support structure.

3. The molding assembly claimed in claim 1, wherein the flexible ring includes a segmented inner diameter forming a set of slots.

4. The molding assembly claimed in claim 1, wherein the flexible ring further includes a set of circular slots within the segmented inner diameter of the flexible ring.

5. The molding assembly claimed in claim 1, wherein the flexible ring is a metal selected from the group consisting of: platinum, tungsten, molybdenum, and tantalum.

6. The molding assembly claimed in claim 1, wherein the flexible ring includes a semi-circular recess.

7. A method of molding a workpiece, comprising the steps of:
   a) providing a molding assembly having:
      i) a plurality of support pillars fixedly attached to a support structure, wherein each one of the plurality of support pillars includes a recessed seat;
      ii) a mold support member;
      iii) a flexible ring for holding a mold in contact with the mold support member under applied high temperatures during glass molding, wherein the flexible ring, while holding the mold, rests upon the recessed seat of a corresponding support pillar; and wherein the flexible ring includes a segmented inner diameter having gripping fingers that flex, during thermal expansion, to relieve contact stress upon the mold, thereby allowing for simultaneous thermal expansion of the flexible ring and continued contact with the support pillars and the mold;
   b) placing the workpiece in the molding assembly; and
   c) pressing the workpiece in the mold.

8. The method claimed in claim 7, wherein the plurality of support pillars include selected regions removed from the each one of the plurality of support pillars to form the recessed seat while providing concentric positioning of the mold support member relative to a cylindrical axis of the support structure.

9. The method claimed in claim 7, wherein the flexible ring includes a segmented inner diameter forming a set of slots.

10. The method claimed in claim 7, wherein the flexible ring further includes a set of circular slots within the segmented inner diameter of the flexible ring.

11. The method claimed in claim 7, wherein the flexible ring is a metal selected from the group consisting of: platinum, tungsten, molybdenum, and tantalum.

12. The method claimed in claim 7, wherein the flexible ring includes a semi-circular recess.

13. The method claimed in claim 7, wherein the workpiece is a lens blank.

* * * * *